Patented Oct. 17, 1950

2,526,319

UNITED STATES PATENT OFFICE 2,526,319

THIENYL ETHYLENE COMPOUNDS

Isaac C. Beatty, III, Williamstown, Mass., assignor to Sprague Electric Company, North Adams, Mass., a corporation of Massachusetts No Drawing. Application July 27, 1946,
Serial No. 686,730

6 Claims. (Cl. 260—329)

This invention relates to new compounds containing the thiophene group and more particularly refers to thienyl ethylenes and ethanes.

It is an object of this invention to produce new compounds which contain the thiophene ring. A further object is to produce new thienyl ethylene compounds which are capable of polymerization to form useful oils and resins. Additional objects will become apparent from a consideration of the following description and claims.

These objects are attained in accordance with the present invention which is concerned with compounds conforming to the following general formula:

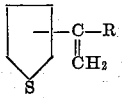

wherein R represents a monovalent organic radical, preferably a hydrocarbon group which may, if desired, be further substituted. In a still more restricted sense, this invention is concerned with thienyl compounds conforming to the general formula:

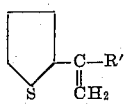

wherein R' represents a monovalent aryl radical, preferably of the benzene series.

The invention is also specifically concerned with the hydrogenated derivatives of the foregoing compounds or their polymers. The thiophene ring, the ethylene side chain or both may be hydrogenated as aforesaid.

A representative group of compounds conforming to the foregoing requirements are the following:

1-phenyl-1-(2'-thienyl)-ethylene
1-(p-tolyl)-1-(2'-thienyl)-ethylene
1-(m-tolyl)-1-(2'-thienyl)-ethylene
1-(o-tolyl)-1-(2'-thienyl)-ethylene
1-(alpha-naphthyl)-1-(2'-thienyl)-ethylene
1-(beta-naphthyl)-1-(2'-thienyl)-ethylene
1-(o-diphenyl)-1-(2'-thienyl)-ethylene
1-(p-diphenyl)-1-(2'-thienyl)-ethylene
1-xylyl-1-(2'-thienyl)-ethylene
1-acenaphthenyl-1-(2'-thienyl)-ethylene
1-phenanthryl-1-(2'-thienyl)-ethylene
1-fluoryl-1-(2'-thienyl)-ethylene
1-anthryl-1-(2'-thienyl)-ethylene 1-(m-trifluoromethylphenyl)-1-(2'-thienyl)-ethylene
1-(p-chlorophenyl)-1-(2'-thienyl)-ethylene
1-(p-fluorophenyl)-1-(2'-thienyl)-ethylene
1-(o-nitrophenyl)-1-(2'-thienyl)-ethylene
1-(o-aminophenyl)-1-(2'-thienyl)-ethylene
1-(p-methoxy phenyl)-1-(2'-thienyl)-ethylene
1,1-bis(2'-thienyl)-ethylene
1-(2'-thienyl)-1-(2'-pyrryl)-ethylene
1-(2'-thienyl)-1-(2'-pyridyl)-ethylene
1-(2'-thienyl)-1-(2'-indyl)-ethylene
1-(2'-thienyl)-1-(2'-furyl)-ethylene
1-(2'-thienyl)-1-(2'-quinolyl)-ethylene
1-(2'-thienyl)-1-(2'-piperidyl)-ethylene
1-(2'-thienyl)-1-(3'-carbazyl)-ethylene as well as the polymers of the above compounds and the corresponding ethane compounds produced by hydrogenation of the ethylene double bond.

The compounds of this invention are readily prepared by reacting acetothienone with the appropriate Grignard intermediate. The tertiary carbinol thus formed dehydrates very readily, spontaneously in some cases, to form the ethylene compounds. The latter may be polymerized by conventional means to form dimers, trimers, and higher polymers, which are oils or resinous solids.

The following examples illustrate the manner of producing the compounds of this invention.

EXAMPLE 1

*Preparation of 1-phenyl-1-(2'-thienyl)-ethylene*

One mole of bromobenzene was added to 1.05 moles of magnesium in 700 ml. of dry ether, and the mixture was refluxed for one hour to complete the reaction. At the end of this time 1 mole of acetothienone was added with continuous agitation. The heat of reaction caused continued reflux for some time, after which heat was applied and the material refluxed and agitated for four hours to complete the reaction.

The mixture was then poured onto a mixture of 1000 gms. of ice and 250 cc. of conc. hydrochloric acid. The mix was extracted with ether, washed with dilute sodium carbonate and water, dried over calcium chloride and the ether was distilled off.

A small amount of potassium acid sulfate was added and the residue (from ether distillation) was heated up to 140° C. at atmospheric pressure to remove all of the water split off from the carbinol. The solution was cooled, extracted with ether, washed with sodium carbonate and water and dried over calcium chloride, after which the ether was distilled off. The residual product was then distilled at 106° C./2 mm. to give a liquid monomer of $N_D^{20°}$ 1.5890. The residue which did not boil at 140° C./3 mm. was an amber resin with a softening point of about 45° C.-55° C., and is believed to be a low polymer of the 1-phenyl-1-(2'-thienyl)-ethylene referred to above as a liquid. The resin had a refractive index of $N_D^{79°}$ 1.3678.

EXAMPLE 2

*Preparation of 1-(p-tolyl)-1-(2'-thienyl)-ethylene*

Para-bromotoluene was substituted for the bromobenzene of Example 1, the procedure being otherwise the same. The monomeric liquid product boiled at 86–88° C./35 microns. Some yield of a low polymer, probably a dimer or trimer, was obtained. This boiled at 180–205° C./38 microns.

EXAMPLE 3

*Preparation of 1-(m-tolyl)-1-(2'-thienyl)-ethylene*

Meta-bromo toluene was substituted for the bromobenzene of Example 1, the procedure being otherwise the same. The m-tolyl product was a liquid, B. P. 102–105° C./40–60 microns.

EXAMPLE 4

*Preparation of 1-(m-trifluoromethylphenyl)-1-(2'-thienyl)-ethylene*

Meta-bromobenzotrifluoride was substituted for the bromobenzene of Example 1, the procedure being otherwise the same. A high yield of the liquid product was obtained, B. P. 90–105° C./.1–.2 mm. The liquid froze to a solid state at about −16° C.

EXAMPLE 5

*Preparation of 1-(alpha-naphthyl)-1-(2'-thienyl)-ethylene*

The procedure of Example 1 was followed with the exception that alpha-bromo naphthalene was substituted for the bromobenzene. The liquid product boiled at 142–145° C./25 microns.

Of course, numerous substituted derivatives of the above compounds may be formed. The thiophene ring and/or the hydrocarbon group (R or R') may be further substituted, if desired. Likewise, the hydrocarbon group R may be a heterocyclic ring, for example a pyrrole group.

The invention is also concerned with the thiolane ethane derivatives of the compounds of the invention. These are produced by hydrogenating the thiophene ring, either during or following the hydrogenation of the ethylene double bond.

The compounds of the invention are useful as dielectric oils and resins, as pharmaceutical intermediates, dyestuff intermediates and the like. The dimers and trimers may be used as substitutes for the mineral oils conventionally employed in electrical capacitors, due to their relatively high boiling points and dipole moments. The higher polymers—either homopolymers or copolymers, produced by conventional polymerization methods with styrene, vinyl carbazole and other polymerizable compounds—may be used for many purposes wherein resins have previously been employed.

As many widely different embodiments of this invention may be made without departing from the spirit and scope hereof, it is to be understood that the invention is not limited to the specific embodiments hereof except as defined in the appended claims.

What I claim is:

1. A compound conforming to the formula

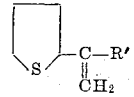

wherein R' represents a monovalent aryl radical.

2. A compound conforming to the formula

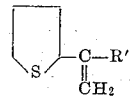

wherein R' represents a monovalent phenyl radical.

3. 1-phenyl-1-(2'-thienyl)-ethylene.
4. 1-(p-tolyl)-1-(2'-thienyl)-ethylene.
5. 1-(m-trifluoromethylphenyl)-1-(2'-thienyl)-ethylene.
6. A compound conforming to the general formula

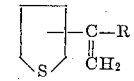

wherein R represents a monovalent cyclic organic radical selected from the group consisting of aryl, pyrryl, pyridyl, indyl, furyl, quinolyl, piperidyl and carbazyl radicals.

ISAAC C. BEATTY, III.

REFERENCES CITED

The following references are of record in the file of this patent:

OTHER REFERENCES

Chemical Abstracts, 27:2443 (5) (1933); 25:4238 (8) (1931).

Richter: "Organic Chemistry," pp. 649, 650, John Wiley, 1938.